June 25, 1968  C. W. O'NEILL  3,390,238
INTRAVENOUS FLUID LEVEL SIGNALLING APPARATUS
Filed May 13, 1966  2 Sheets-Sheet 2
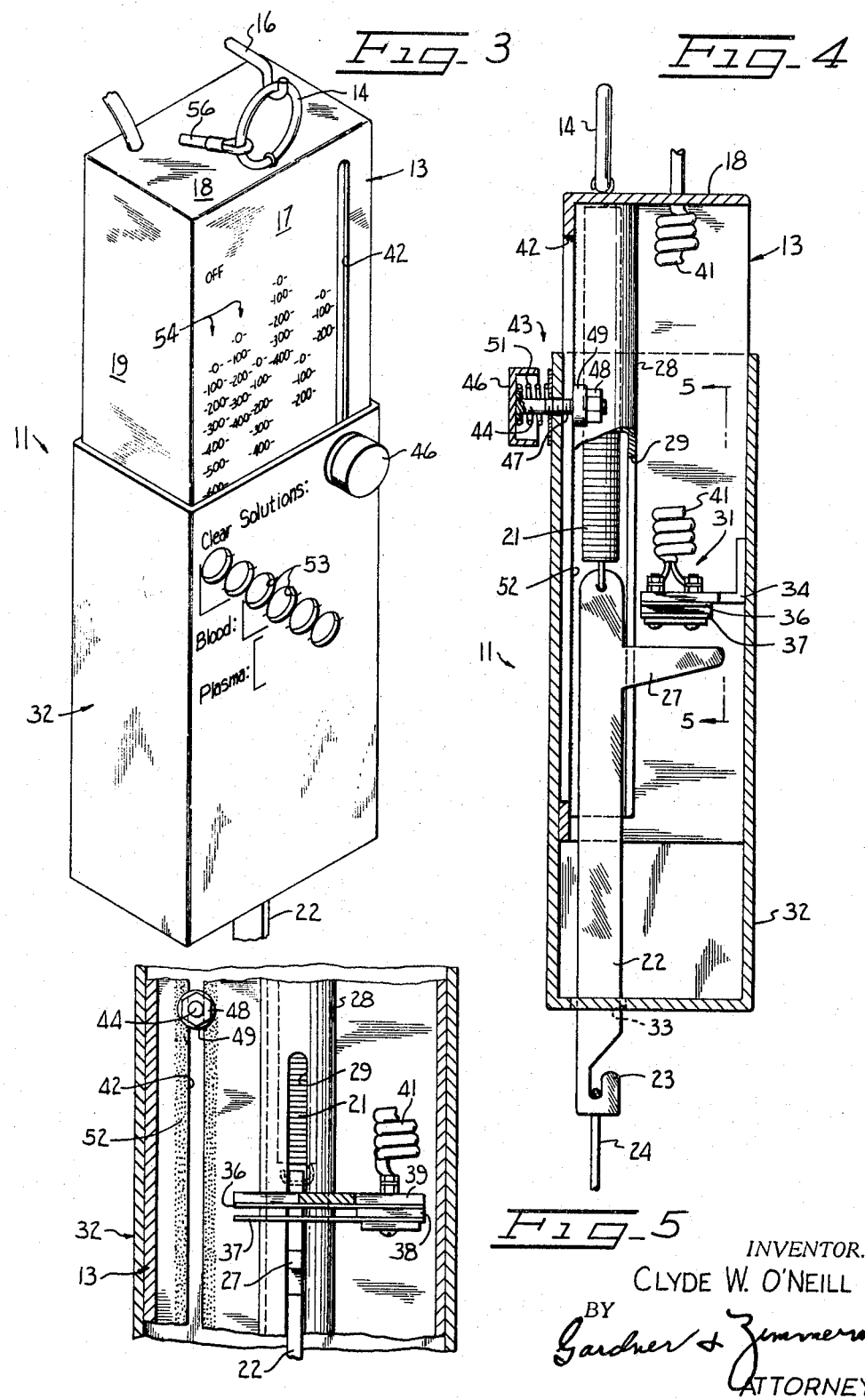
INVENTOR.
CLYDE W. O'NEILL
BY
Gardner & Zimmerman
ATTORNEYS

United States Patent Office 3,390,238
Patented June 25, 1968

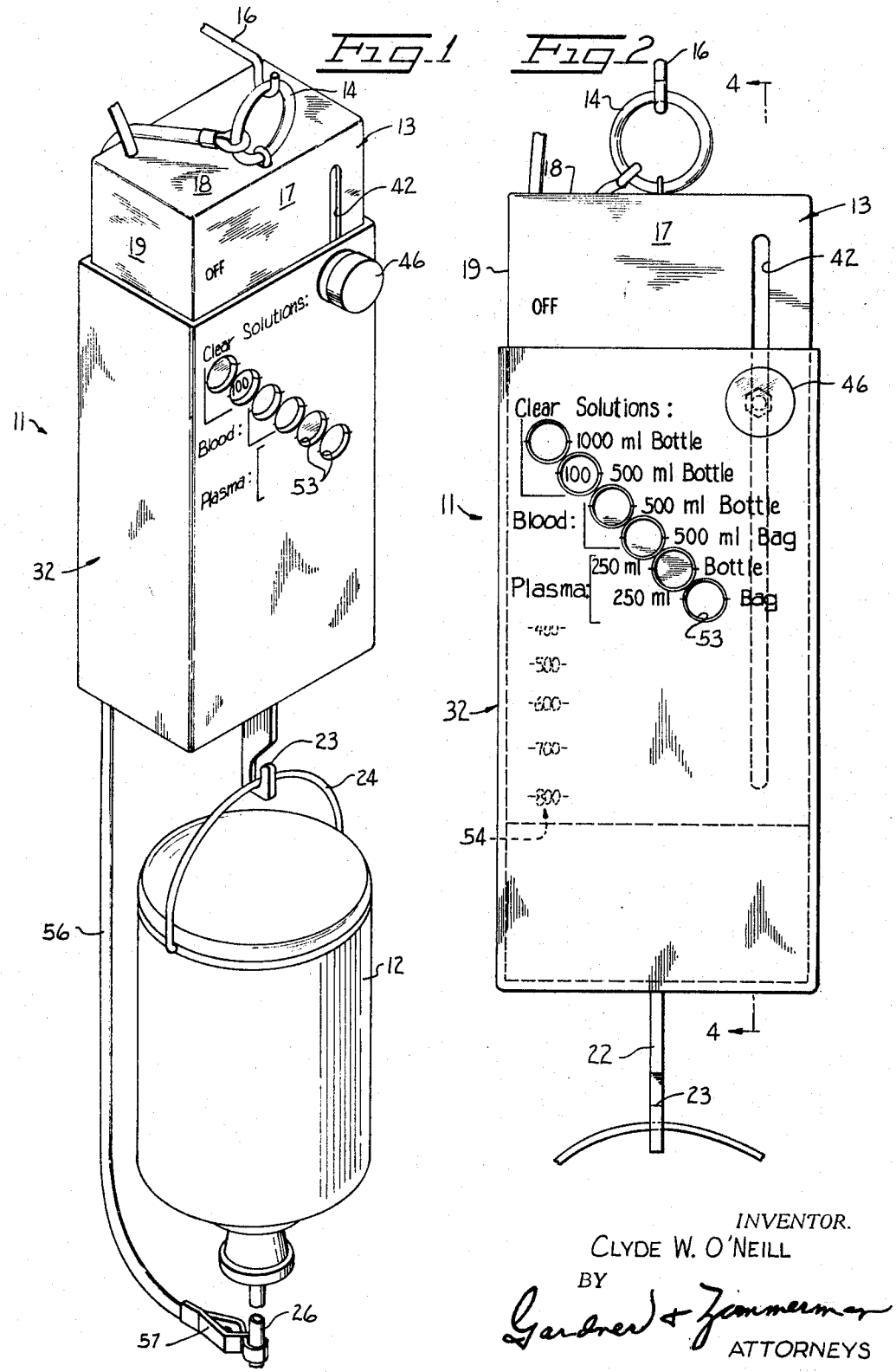

3,390,238
INTRAVENOUS FLUID LEVEL SIGNALLING
APPARATUS
Clyde W. O'Neill, 35 Excelsior Court,
Oakland, Calif. 94610
Filed May 13, 1966, Ser. No. 549,988
8 Claims. (Cl. 200—85)

This invention relates generally to intravenous fluid level signalling apparatus, and is more particularly directed to apparatus of this type which is adjustable to signal a plurality of predetermined levels or quantities of a variety of intravenous fluids which may be provided in a variety of different size and types of containers that are frequently encountered.

Various intravenous alarm devices have been provided heretofore to signal when the fluid a patient is receiving by gravity intravenous infusion has drained to a predetermined quantity, or level. Typically, such devices include a spring secured to a mounting bracket, or equivalent support means adapted to be secured to the head of a bed, a stand, or the like. A member secured to the lower end of the spring serves to suspend a container of intravenous fluid therefrom. The spring is extended in proportion to the weight of the container and fluid. As the fluid drains from the container, the amount of spring extension diminishes and the container suspending member moves upwardly with respect to the mounting bracket. Switch means mounted in predetermined fixed position on the mounting bracket are actuated in response to the suspending member moving to a corresponding position. For example, the switch means may be operatively engaged by an arm projecting from the member upon upward movement thereof to the predetermined position of the switch means. Such actuation of the switch means thus occurs when the combined weight of the container and fluid has a particular value corresponding to a predetermined quantity or level of fluid remaining in the container. The switch means in turn operates to signal an alarm for alerting the nurse that the fluid has drained to the predetermined quantity. Usually the predetermined quantity of fluid is selected to be a small percentage of the original contents of the container such that the alarm is actuated just before the container empties. The nurse may be then in attendance to take whatever action is necessary upon emptying of the container. It will be appreciated that the characteristics of the spring and the relative arrangement of the parts are preselected in accordance with the particular quantity of fluid desired to be signalled. With previous signalling apparatus, the preselected fixed arrangement of the parts is suitable for signalling a simple predetermined quantity of a single predetermined fluid remaining in a single type and size of container. For example a given apparatus may only be used with a 250 ml. bottle of blood to signal when 25 ml. remains. The same apparatus could not be employed to signal when a different quantity such as 100 ml. remains. Similarly a different size bottle, e.g., 500 ml., a different type of container such as a bag, or a different solution such as plasma, could not be used with the same signalling apparatus since the differences in weight would not be compatible with the preselected fixed arrangement of the parts.

It is an object of the present invention to provide an improved intravenous fluid level signalling apparatus which is capable of being adjusted to signal when any one of a plurality of different quantities of fluid remains in a given container.

Another object of the invention is the provision of intravenous fluid level signalling apparatus which may be interchangeably employed with containers of different types and sizes and with different fluids contained therein to signal predetermined quantities of fluid.

Still another object of the invention is to provide signalling apparatus of the class described which may be arranged to signal through existing intercom systems provided in most present day hospitals.

It is yet another object of the invention to provide signalling apparatus of the character outlined hereinbefore which is arranged to prevent pull on the intravenous tubing from being detrimentally transmitted to the signalling mechanism.

A further object of the invention is the provision of an extremely versatile intravenous fluid signalling apparatus of relatively simple compact design.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 1 is a perspective view of intravenous fluid level signalling apparatus in accordance with the present invention.

FIGURE 2 is a front elevational view of the apparatus.

FIGURE 3 is a view similar to FIGURE 1, but with the apparatus in a different position of adjustment.

FIGURE 4 is a sectional view taken at line 4—4 of FIGURE 2.

FIGURE 5 is a sectional view taken at line 5—5 of FIGURE 4.

Referring now to the drawings, FIGURES 1 and 4 in particular, there is shown intravenous fluid level signalling apparatus 11, in accordance with the present invention, for signalling when the quantity of intravenous fluid being delivered to a patient by gravity intravenous infusion from a container 12 drains to a predetermined quantity, or level. More particularly, the apparatus 11 includes a support housing 13 having a ring 14 at its upper end to facilitate hanging from an arm 16 extending for example, from the head of a bed, a rack, or the like. Various alternatives are of course possible to facilitate securance of the housing to an elevated support. Support housing 13 is preferably of hollow rectangular configuration including front, top, and side walls 17, 18, 19, while being open at the back and bottom. A spring 21 is secured to the top wall 18 to depend therefrom, and a suspension member 22 is secured to the lower end of the spring to facilitate securance of the container 12. The suspension member is preferably in the form of an elongated rectangular strip formed with a hook 23 at its lower end for receiving the bail 24 of the container. It will be thus appreciated that the container 12 as suspended by member 22, elongates the spring 21 by an amount proportional to the weight of the container and contents thereof. As the fluid is dispensed from the container through the intravenous tube 26 extending therefrom during an intravenous infusion, the spring elongation diminishes due to the continuous reduction in the quantity of fluid remaining in the container. The suspension member 22 thus moves upwardly into the support housing 13, with the vertical position of a given point on the suspension member being representative of the quantity of fluid remaining in the container. In this regard, the member 22 is formed with an outwardly projecting horizontal arm 27, the vertical position of which depends on the combined weight of the container and fluid contents thereof. In order to restrict movement of the suspension member to the vertical direction, the support housing 13 is preferably provided with a guide bushing 28 depending from top wall 18 and encompassing the spring and upper end of the suspension member. The bushing is provided with a vertically extending slot 29 through which the arm 27 extends towards the open back of the housing 13. The bushing thus confines the suspension member to prevent rotation and horizontal translation thereof.

To effect signalling an alarm when the fluid remaining in the container 12 drains to a predtermined quantity, a switch 31 is provided for actuating engagement by the arm 27 when the vertical position thereof corresponds to such predetermined quantity. In accordance with the particularly salient aspects of the invention, means are provided to mount the switch for vertical movement relative to the housing 13. As a result, the vertical position at which the switch is actuated by the arm 27 may be selectively varied such that the switch may be actuated in response to different predetermined quantities of fluid remaining in the container. In addition, the adjustability of switch position facilitates calibration of the signalling apparatus for use with different sizes and types of intravenous containers and with different intravenous fluids.

In the preferred form of the signalling apparatus, adjustment of switch position is facilitated by means of an outer rectangular casing 32 open at one end to slidably receive the housing 13. The closed end of the casing is provided with a slot 33 for traversal by the suspension member 22. The switch 31 is carried by a bracket 34 secured to the rear wall of the casing and projecting horizontally therefrom through the open back of housing 13 into the interior thereof. The switch advantageously comprises a pair of conducting strips 36, 37 secured in parallel spaced relation by means of an interposed insulating spacer 38 at one end thereof. The strip 36 is secured to a rigid backing element 39 of insulating material, while the strip 37 is unsupported at its free end and is flexible. The bracket supports the strips 36, 37 transverse to the path of movement of the arm 27. As the arm moves upwardly, it engages the strip 37 to urge same into contact with the strip 36, thus closing the switch. The strips 36, 37 are connected to the respective conductors of a cord 41 which extends upwardly through the top wall of housing 13 and is coiled in the region between the switch and top wall of the housing to permit relative vertical movement between the housing and casing.

The cord 41 may be connected to an existing hospital intercom system, or the like, to signal an alarm in response to closure of the switch. Such an intercom system typically includes a push button switch at the patients bedside and a light above the door of the patients room. In addition, a light is provided on a panel at the nurses station together with an alarm bell. When the patient actuates the push button switch, the light above the door is turned on, as is the corresponding light on the panel. The alarm bell also sounds. In order to use such a system with the intravenous fluid level signalling apparatus, it is merely necessary to connect the cord 41 to the intercom to parallel the switch 31 with the push button switch. When switch 31 is closed responsive to a predetermined quantity of fluid remaining in the container 12, the lights and bell of the itnercom system are energized. The nurse can readily tell whether the patient or signalling apparatus has initiated the alarm signal, because in response to the nurse pressing a button on the panel, the pushbutton switch is reset to open position while the switch 31 will remain closed. Thus, the signal light on the panel will remain lighted if the signalling apparatus is signalling, but will go out if the patient has signalled by actuating the pushbutton switch.

It will be appreciated that the housing 13 and casing 32 may be vertically translated relative to each other to vary the position of the switch 31 relative to the arm 27. In this manner, the switch may be selectively positioned for actuation in response to different predetermined quantities of fluid remaining in the container 12. To lock the housing and casing at different relative positions, the front wall 17 of the housing is provided with a vertically extending slot 42 for traversal by a latch mechanism 43. Such mechanism preferably includes a pin 44 having a cupped cylindrical button 46 secured to one end and extending through an aperture 47 in the front wall of the casing and through the slot 42. The opposite end of the pin is threaded for securance of a nut 48 thereto, and a washer 49 is interposed betwen the nut and interior face of the front wall of the housing to define an outwardly flared flange bearing thereagainst. A spring 51 is concentrically disposed on the pin to act between the exterior face of the front wall of the casing and the linear end face of the button 46. The spring thus normally urges the pin outwardly to tightly engage the washer 49 against the interior of the front wall of the housing. The interior surface of this front wall is abraded, as indicated at 52, adjacent the slot 42. The washer engages the abraded surface to lock the housing against vertical movement relative to the casing. When it is desired to change the relative positions of the housing and casing, the button 46 is depressed to thereby disengage the washer from the abraded surface. The housing and casing may be then moved vertically with respect to each other to vary the position of the switch 31 relative to the arm 27. To lock the housing and casing together when same have desired relative positions, the button is released to again tightly engage the washer against the abraded surface. In this manner the signalling apparatus may be readily adjusted to effect signalling of different predetermined quantities of fluid remaining in the container 12.

As a particularly important feature of the invention the apparatus 11 includes means for calibrating relative positions of the housing and casing to different quantities of different fluids remaining in a variety of sizes and types of containers. More particularly, a plurality of apertures 53 are provided in the front wall of casing 32, preferably along a substantially diagonal line so as to be longitudinally and transversely offset relative to each other. Each aperture corresponds to a different size or type of container of various fluids that may be encountered. In this regard the two uppermost apertures may represent clear solutions provided in 1000 and 500 ml. bottles, corresponding indicia being provided on the front wall of the casing as indicated in FIGURE 2. The next two apertures represent blood provided in a 500 ml. bottle and 500 ml. bag, respectively. The last two apertures are representative of plasma provided respectively in a 250 ml. bottle and 250 ml. bag. Corresponding columns 54 of fluid quantity calibrations are provided on the front wall of the housing 13. These quantity calibrations are selectively visible through the apertures upon relative vertical translation of the housing and casing. For whatever fluid and type and size of container that is to be employed, the corresponding aperture is observed. The button 46 is depressed and the casing and housing are moved relative to each other until the calibration designating a quantity of fluid to be signalled is visible through such aperture. The button 46 is released to lock the positions of the housing and casing. At this time the switch 31 is so positioned relative to the arm 27 that when the selected quantity of particular fluid remains in the selected type and size of container, the arm engages the switch to close same and signal the alarm. For example, assume that it is desired to signal when 100 ml. of blood remains in a 500 ml. bag. The housing and casing are moved to expose the 100 ml. calibration in the fourth aperture 53, which corresponds to blood in a 500 ml. bag. The switch will then be actuated when 100 ml. of blood remains.

In order that operation of the signalling apparatus will not be detrimental by movements of the patient exerting pull on the tube 26, a safety cord 56 is preferably secured to the hook 14 and provided with a clamp 57 at its lower end. The clamp may be secured to the tube to transmit any pull to the housing 13, and thereby relieve pull on the container 12 and thus the suspension element 22.

What is claimed is:
1. Intravenous fluid level signalling apparatus comprising support means adapted for securance to an elevated support, a spring depending from said support means, a suspension member secured to the lower end of said spring and adapted for securance of a container of intravenous fluid thereto, a casing encompassing said support means and being vertically slidable relative thereto, one of said casing and suspension member carrying a switch actuating means at a predetermined fixed point thereof, said suspension member moving vertically upward as said fluid is dispensed from said container with the relative vertical position between said casing and suspension member of said fixed point being representative of the quantity of fluid remaining in said container, a switch mounted on the other of said casing and suspension member acutatable by said actuating means when the former and latter are at the same vertical position, said casing having a plurality of apertures therethrough respectively corresponding to different sizes and types of containers of different intravenous fluids, said support means having a face subjacent said apertures with columns of quantity calibrations selectively visible through said apertures upon relative vertical movement between said casing and support means, said calibrations corresponding to quantities of fluid represented by vertical relative positions between said casing and suspension member of said switch actuating means for the different sizes and types of containers of different fluids represented by the corresponding apertures, and latch means for selectively locking said casing and support means in different relative vertical positions.

2. Apparatus according to claim 1, further defined by said support means being a rectangular housing having front, top, and side walls while being open at the back and bottom, said spring depending from the top wall of said housing, said suspension member being an elongated rectangular strip secured to said spring and formed with a hook at its lower end for receiving the bail of a container, said strip having a horizontally projecting arm defining said switch actuating means, said switch mounting means comprising a rectangular casing having an open upper end slidably receiving said housing, said casing having a slot in its lower end traversed by said strip, said switch secured to said casing and including a pair of parallel spaced conducting strips projecting through the open back of said housing into the path of said arm, one of said conducting strips being flexible.

3. Apparatus according to claim 2, further defined by means for selectively locking said housing and casing at different relative vertical positions.

4. Apparatus according to claim 3, further defined by said housing having a vertically extending slot in the front wall thereof, and said locking means comprising a pin extending through an aperture in the front wall of said casing and through said slot, a button secured to the outer end of said pin, means defining an outwardly flared flange at the inner end of said pin bearing against the interior face of the front wall of said housing adjacent said slot, means spring loading said pin outwardly, and means defining an abraded surface on the interior face of the front wall of said housing adjacent said slot.

5. Apparatus according to claim 4, wherein the spring loading means comprises a spring concentrically disposed on said pin and acting between said front wall of said casing and said button.

6. Apparatus according to claim 2, further defined by said casing having a plurality of apertures therethrough respectively corresponding to different sizes and types of containers of different intravenous fluids, and said front wall of said housing having columns of quantity calibrations selectively visible through said apertures upon relative vertical movement between said housing and casing, said calibrations corresponding to quantities of fluid represented by vertical positions of said arm for the different sizes and types of containers of different fluids represented by the corresponding apertures.

7. Apparatus according to claim 6, further defined by said housing having a vertically extending slot in the front wall thereof, a pin extending through an aperture in the front wall of said casing and through said slot, a button secured to the outer end of said pin, means defining an outwardly flared flange at the inner end of said pin bearing against the interior face of the front wall of said housing adjacent said slot, means spring loading said pin outwardly, and means defining an abraded surface on the interior face of the front wall of said housing adjacent said slot.

8. Apparatus according to claim 7, further defined by a cord secured to said housing and having a clamp at its free end for securance to an intravenous tube extending from an intravenous container carried by said suspension member.

No references cited.

BERNARD A. GILHEANY, *Primary Examiner.*

F. E. BELL, *Assistant Examiner.*